(12) United States Patent
Roba et al.

(10) Patent No.: US 7,200,310 B2
(45) Date of Patent: Apr. 3, 2007

(54) OPTICAL FIBER

(75) Inventors: Giacomo Stefano Roba, Monza (IT);
Lidia Terruzzi, Triuggio (IT); Sabrina Fogliani, Segrate (IT); Marco Arimondi, Pavia (IT); Sandra Joanna Nagelvoort, WN Vlaardingen (NL); Johannes Adrianus Van Eekelen, Pe Rozenburg (NL); Adrianus Gijsbertus Maria Abel, Ka Capelle A/D Ijssel (NL); Gouke Dirk Jan Geus, Vlaardingen (NL); Duurt Pleter Willem Alklma, The Hague (NL)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 0 days.

(21) Appl. No.: 11/442,279

(22) Filed: May 30, 2006

(65) Prior Publication Data
US 2006/0228083 A1    Oct. 12, 2006

Related U.S. Application Data

(63) Continuation of application No. 10/512,238, filed as application No. PCT/EP02/04507 on Apr. 24, 2002, now Pat. No. 7,085,466.

(51) Int. Cl.
*G02B 6/02* (2006.01)
(52) U.S. Cl. .................... 385/128; 385/126
(58) Field of Classification Search ............... 385/128, 385/126
See application file for complete search history.

(56) References Cited

U.S. PATENT DOCUMENTS 4,474,830 A    10/1984  Taylor
4,962,992 A    10/1990  Chapin et al.
5,104,433 A *   4/1992  Chapin et al. ............... 65/432
6,459,837 B1   10/2002  Fitz et al.
2003/0147615 A1  8/2003  Szum et al.

FOREIGN PATENT DOCUMENTS

| EP | 0 311 186 A1 | 4/1989 |
|----|--------------|--------|
| EP | 0 539 030 A1 | 4/1993 |
| EP | 1 070 682 A1 | 1/2001 |

(Continued)

OTHER PUBLICATIONS

Evans et al., "Poisson's Ratio," Mechanical Properties and Testing of Polymers, edited by G.M. Swallowe, pp. 183-186, no date.

(Continued)

*Primary Examiner*—Ellen E. Kim
(74) *Attorney, Agent, or Firm*—Finnegan, Henderson, Farabow, Garrett & Dunner, L.L.P.

(57) ABSTRACT

Optical fiber capable of controlling attenuation losses caused by microbending on the signal transmitted thereby. The optical fiber comprises: a) an internal glass portion; b) a first coating layer of a first polymeric material surrounding said glass portion; and c) a second coating layer of a second polymeric material surrounding said first coating layer, wherein said first polymeric material has a hardening temperature lower than $-10°$ C., an equilibrium tensile modulus lower than 1.5 MPa, wherein said first coating layer has a thickness of from 18 μm to 28 μm and wherein said second coating layer has a thickness of from 10 μm to 20 μm.

15 Claims, 8 Drawing Sheets

FOREIGN PATENT DOCUMENTS

| WO | WO 92/04391 | 3/1992 |
|----|----|----|
| WO | WO 98/50317 | 11/1998 |
| WO | WO 99/26891 | 6/1999 |
| WO | WO 99/67180 | 12/1999 |
| WO | WO 00/28014 | 5/2000 |
| WO | WO 01/05724 A2 | 1/2001 |
| WO | WO 01/49624 A2 | 7/2001 |
| WO | WO 02/39069 A2 | 5/2002 |
| WO | WO 03/091177 A1 | 11/2003 |

OTHER PUBLICATIONS

Haines, P., "Thermomechanical, Dynamic Mechanical and Associated Methods", Thermal Methods of Analysis, Blackie Academic and Professionals, ed., p. 133, no date.

G. Grasso et al., "Microbending Losses of Cabled Single Mode Fibres", ECOC '88, pp. 526-529, (Sep. 15, 1988).

English-language Abstract for WO 92/04391, no date.

* cited by examiner

OPTICAL FIBER

This is a continuation of U.S. patent application Ser. No. 10/512,238, filed Jun. 3, 2005, now a U.S. Pat. No. 7,085,466, which was a national phase application based on PCT/EP02/04507, filed Apr. 24, 2002, all of which are incorporated herein by reference.

FIELD OF THE INVENTION

The present invention relates to an optical fiber, in particular to an optical fiber capable of controlling the attenuation losses caused by microbending on the signal transmitted thereby.

BACKGROUND ART

Optical fibers commonly consist of a glass portion (typically with a diameter of about 120–130 µm), inside which the transmitted optical signal is confined, The glass portion is typically protected by an outer coating, typically of polymeric material. This protective coating typically comprises a first coating layer positioned directly onto the glass surface, also known as the "primary coating," and of at least a second coating layer, also known as "secondary coating," disposed to surround said first coating. In the art, the combination of primary coating and secondary coating is sometimes also identified as "primary coating system," as both these layer are generally applied during the drawing manufacturing process of the fiber, in contrast with "secondary coating layers" which may be applied subsequently. In this case, the coating in contact with the glass portion of the fiber is called "inner primary coating" while the coating on the outer surface of the fiber is called "outer primary coating." In the present description and claims, the two coating layers will be identified as primary and secondary coating, respectively, and the combination of the two as "coating system."

The thickness of the primary coating typically ranges from about 25 µm to about 35 µm, while the thickness of the secondary coating typically ranges from about 10 µm to about 30 µm.

These polymer coatings may be obtained from compositions comprising oligomers and monomers that are generally crosslinked by means of UV irradiation in the presence of a suitable photo-initiator. The two coatings described above differ, inter alia, in the mechanical properties of the respective materials. As a matter of fact, whereas the material which forms the primary coating is a relatively soft material, with a relatively low modulus of elasticity at room temperature, the material which forms the secondary coating is relatively harder, having higher modulus of elasticity values at room temperature. The coating system is selected to provide environmental protection to the glass fiber and resistance, inter alia, to the well-known phenomenon of microbending, which can lead to attenuation of the signal transmission capability of the fiber and is therefore undesirable. In addition, coating system is designed to provide the desired resistance to physical handling forces, such as those encountered when the fiber is submitted to cabling operations.

The optical fiber thus composed usually has a total diameter of about 250 µm. However, for particular applications, this total diameter may also be smaller; in this case, a coating of reduced thickness is generally applied.

In addition, as the operator must be able to identify different fibers with certainty when a plurality of fibers are contained in the same housing, it is convenient to color the various fibers with different identifying colors. Typically, an optical fiber is color-identified by surrounding the secondary coating with a third colored polymer layer, commonly known as "ink", having a thickness typically of between about 2 µm and about 10 µm, or alternatively by introducing a colored pigment directly into the composition of the secondary coating.

Among the parameters which characterize primary and secondary coatings performances, elastic modulus and glass transition temperature of the cross-linked materials are those which are generally used to define the mechanical properties of the coating. When referring to the elastic modulus it should be clarified that in the patent literature this is sometimes referred to as "shear" modulus (or modulus measured in shear), while in some other cases as "tensile" modulus (or modulus measured in tension). The determination of said elastic moduli can be made by means of DMA (Dynamic mechanical analysis) which is a thermal analysis technique that measures the properties of the materials as they are deformed under periodical stress. For polymeric materials, the ratio between the two moduli is generally 1:3, i.e. the tensile modulus of a polymeric material is typically about three times the shear modulus (see for instance the reference book Mechanical Properties and Testing of Polymers, pp. 183–186; Ed. G. M. Swallowe)

Examples of coating systems are disclosed, for instance, in U.S. Pat. No. 4,962,992. In said patent, it is stated that a soft primary coating is more likely to resist to lateral loading and thus to microbending. It thus teaches that an equilibrium shear modulus of about 70–200 psi (0.48–1.38 MPa) is acceptable, while it is preferred that such modulus being of 70–150 psi (0.48–1.03 MPa). These values correspond to a tensile modulus E' of 1.4–4.13 MPa and 1.4–3.1 MPa, respectively. As disclosed in said patent, a too low equilibrium modulus may cause fiber buckling inside the primary coating and delamination of the coating system. In addition, said patents suggests that the glass transition temperature (Tg) of the primary coating material should not exceed −40° C., said Tg being defined as the temperature, determined by means of stress/strain measurement, at which the modulus of the material changes from a relatively high value occurring in the lower temperature, glassy state of the material to a lower value occurring in the transition region to the higher temperature, elastomeric (or rubbery) state of the material.

However, as noticed by the Applicants, although a primary coating has a relatively low value of Tg (as generally required by the art), the value of the modulus of the coating material may nevertheless begin to increase at temperatures much higher than the Tg, typically already above 0° C. Thus, while a low value of Tg simply implies that the transition of said coating from its rubbery to its glassy state takes place at relatively low temperatures, no information can be derived as to which would be the variation of the modulus upon temperature decrease. As a matter of fact, an excessive increase of the modulus of the primary coating upon temperature decrease may negatively affect the optical performances of the optical fiber, in particular at the low temperature values, thus causing undesirable attenuation of the transmitted signal due to microbending.

This problem is further worsened when the optical fibers are inserted into a cable structure, typically within a polymeric protecting sheath, which may in general take the form of a tube. Microbending typically arises whenever the optical fibers get in contact with the surface of said housing sheath. For instance, as the coefficient of thermal expansion of polymeric materials generally employed as protecting sheaths is much higher than the one of glass, upon temperature decrease the polymeric sheath is thus subjected to a greater shrinkage with respect to optical fibers. This results in the optical fibers to become in contact with the inner walls of the tube, thus possibly determining a local pressure which may then result in the microbending phenomena.

Thus, as observed by the Applicants, what seems important for controlling the microbending of an optical fiber, particularly when inserted into a cable structure, is the temperature at which the coating material begins the transition from its rubbery state (soft) to its glassy state (hard), which temperature will be referred in the following of this specification and claims as the "hardening temperature" of the material, or Th. In addition, the Applicants have observed that the microbending of an optical fiber can be further controlled by using a primary coating with a relatively low equilibrium modulus and by using a primary coating and a second coating layer having specific thickness ranges. Particularly advantageous results are obtained by selecting a cured composition which still shows a relatively low modulus at said Th, so that an excessive increase of the modulus upon further temperature decrease is avoided.

In the present description and claims, the term "modulus" is referred to the modulus of a polymeric material as determined by means of a DMA test in tension, as illustrated in detail in the test method section of the experimental part of the present specification.

In the present description and claims, the term "hardening temperature" is referred to the transition temperature at which the material shows an appreciable increase of its modulus (upon temperature decrease), thus indicating the beginning of an appreciable change from a relatively soft and flexible material (rubber-like material) into a relatively hard and brittle material (glass-like material). The mathematical determination of Th will be explained in detail in the following of the description.

According to the present invention, the Applicants have thus found that attenuation losses caused by microbending onto a coated optical fibers, particularly at the low exercise temperatures, can be reduced by suitably controlling the increase of the modulus at the low temperatures. In particular, the Applicants have found that said microbending losses can be reduced by using a polymeric material for the primary coating having a low hardening temperature and by using a primary coating and a second coating layer having specific thickness ranges. In addition, the Applicants have found that by selecting coating compositions having a relatively low equilibrium modulus, said attenuation losses can be further controlled over the whole operating temperature range.

SUMMARY OF THE INVENTION

According to a first aspect, the present invention relates to an optical fiber comprising: a) an internal glass portion; b) a first coating layer of a first polymeric material surrounding said glass portion; and c) a second coating layer of a second polymeric material surrounding said first coating layer, wherein said first polymeric material has a hardening temperature lower than −10° C., an equilibrium tensile modulus lower than 1.5 MPa, wherein said first coating layer has a thickness of from 18 μm to 28 μm and wherein said second coating layer has a thickness of from 10 μm to 20 μm.

Preferably, the equilibrium modulus of said first polymeric material is lower than 1.4 MPa and more preferably lower than 1.3 MPa.

According to a preferred embodiment, the polymeric material forming said primary coating has:

a) a hardening temperature (Th) of from −10° C. to about −20° C. and a modulus measured at said Th lower than 5.0 MPa; or
b) a hardening temperature (Th) of from −20° C. to about −30° C. and a modulus measured at said Th lower than 20.0 MPa; or
c) a hardening temperature (Th) lower than about −30° C. and a modulus measured at said Th lower than 70.0 MPa.

Preferably said material forming said coating layer has:

a) a hardening temperature (Th) of from −10° C. to about −20° C. and a modulus measured at said Th lower than 4.0 MPa; or
b) a hardening temperature (Th) of from −20° C. to about −30° C. and a modulus measured at said Th lower than 15.0 MPa; or
a hardening temperature (Th) lower than about −30° C. and a modulus measured at said Th lower than 50.0 MPa.

According to a further preferred embodiment the glass transition temperature of the material is not higher than about −30° C., more preferably not higher than −40° C. and much more preferably not higher than −50° C.

Preferably, said first polymeric material is obtained by curing a radiation curable composition comprising a radiation curable oligomer comprising a backbone derived from polypropylene glycol and a dimer acid based polyester polyol.

DESCRIPTION OF PREFERRED EMBODIMENTS

As mentioned above, the optical fiber according to the invention comprises on a glass portion thereof a primary coating layer formed from a polymeric material having a relatively low hardening temperature and low equilibrium modulus.

Figure 2:
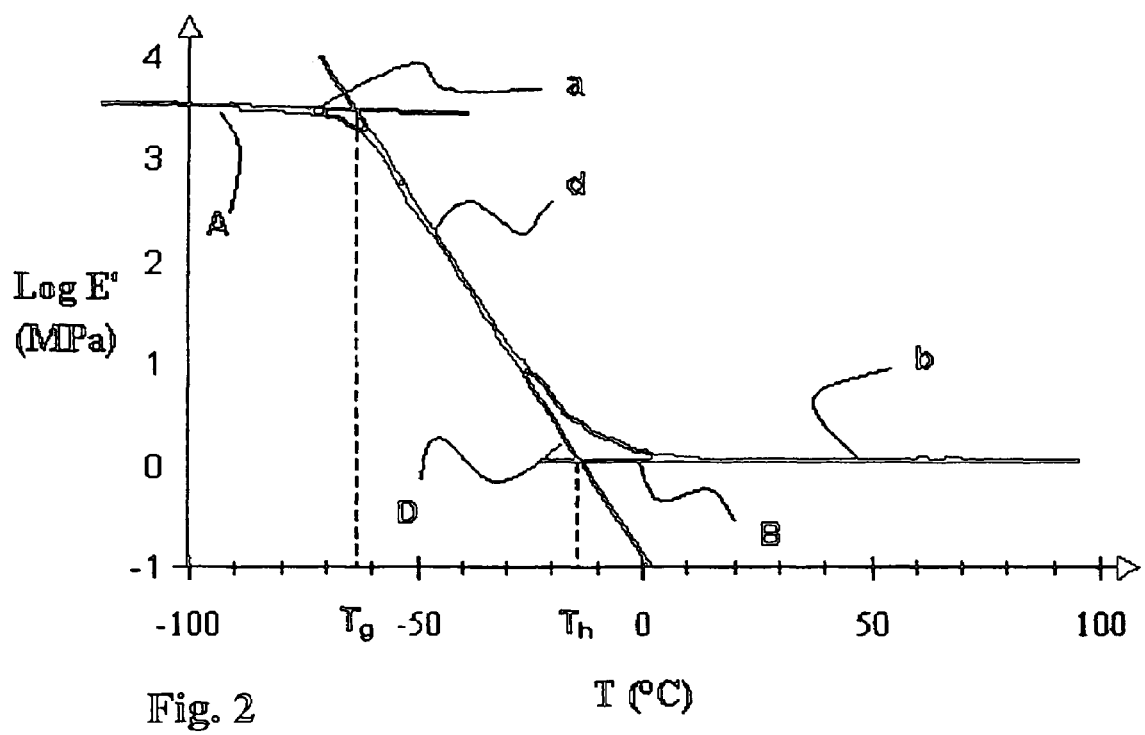
FIG. 2 shows an illustrative DMA plot of a polymeric material suitable for an optical fiber according to the invention.
Figure 3:
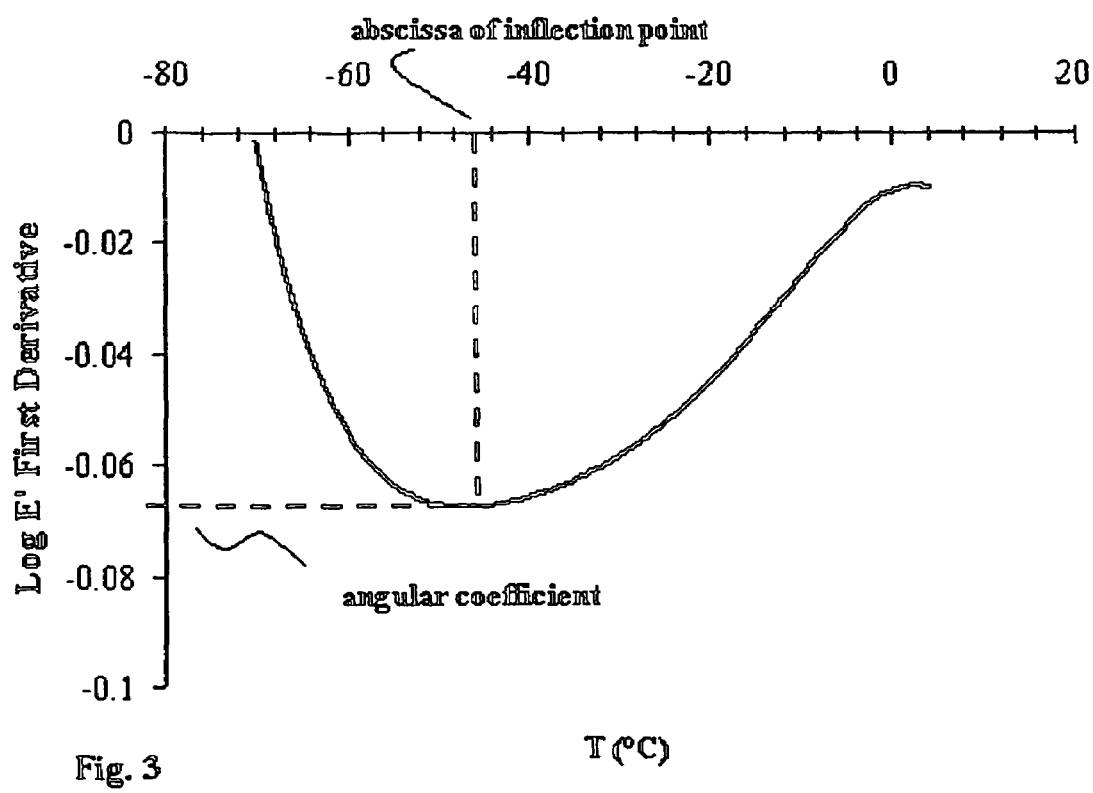
FIG. 3 shows the curve corresponding to the first derivative of the DMA plot of FIG. 2.

To better explain the meaning of the hardening temperature, reference is made to the curve shown in FIG. 2. This curve, typically obtained by a DMA (Dynamic Mechanical Analysis), represents the variation of the modulus of a polymeric material vs. temperature. As shown by this curve, the polymeric material has a relatively high value of modulus at the low temperatures (glassy state, portion "a" of the curve), while said value becomes much lower when the polymer is in its rubbery state, at the higher temperatures (portion "b" of the curve, equilibrium modulus). The oblique portion "d" of the curve represents the transition of the material from the glassy to the rubbery state. The transition between the glassy state and the rubbery state is known in the art as the "glass transition" of the material and is generally associated to a specific temperature (Tg, glass transition temperature). As apparent from the curve, the transition between the glassy and the rubbery state takes place over a relatively wide range of temperatures. For apparent practical reasons, methods has thus been developed for determining a specific Tg value for each polymer. One of this methods (see for instance P. Haines, "Thermal Methods of Analysis," p. 133. Blackie Academic and professionals ed.), which is the one used for determining the Tg values indicated in the present description and claims, comprises determining the intersection point of two lines. The first line (identified as "A" in FIG. 2) is determined by interpolating the points of the DMA curve in the plateau region of the glassy state (portion "a" of the curve). In the practice, for primary coating compositions the interpolation is calculated for the points in the region from −60° C. to −80° C. The second line (identified as "D" in FIG. 2) is determined as the tangent to the inflection point of the DMA curve in the oblique portion "d" of said curve. The inflection point and the inclination of the tangent in that point can be determined as usual by means of the first derivative of the DMA curve, as shown in FIG. 3. According to the curve shown in FIG. 3, the abscissa of the minimum point of the curve gives the respective abscissa of the inflection point on the DMA curve of FIG. 2, while the ordinate gives the inclination (angular coefficient) of the tangent line in said inflection point.

In the practice, the derivative of each experimental point is first calculated and then the curve interpolating the derivative points is determined as known in the art. For avoiding unnecessary calculations, only those points falling within a relatively narrow temperature range around the minimum point are taken into account for the regression. Depending from the distribution of the experimental points, this range may vary between 40° C. (about ±20° C. around the minimum point) and 60° C. (about ±20° C. around the minimum point). A $6^{th}$ degree polynomial curve is considered in general sufficient to obtain an curve to fit with the derivative of the experimental points.

As shown in FIG. 2 the so determined glass transition temperature is of about −62° C.

Similarly to the Tg, also the hardening temperature (Th) of a polymeric material can be determined by the above method. The Th is thus determined as the intersection point between line "B" and the above defined line "D", as shown in FIG. 2. Line "B" is determined by interpolating the points of the DMA curve in the plateau region of the rubbery state (portion "b" of the curve) i.e. at the equilibrium modulus of the material. In the practice, for primary coating compositions the interpolation is calculated for the points in the region from 20° C. and 40° C.

As shown in FIG. 2, the Th calculated according to the above method will thus be of about −13° C.

As observed by the applicants, when the cured material forming the primary coating of the optical fiber has a Th lower than about −10° C., preferably lower than −12° C. and an equilibrium modulus lower than 1.5 MPa, preferably lower than 1.4 MPa and more preferably lower than 1.3 MPa, the optical performance of the optical fiber can be further improved, particularly by reducing its microbending sensitivity in the whole operating temperature range and particularly at the low temperatures of exercise, e.g. below 0° C. As a matter of fact, the combination of these two parameters in a cured polymeric material applied as primary coating on an optical fiber according to the invention results in a relatively smooth increase of the modulus upon temperature decrease, thus allowing to control the microbending phenomena down to the lower operating temperature limits, typically −30° C.

Said modulus should however preferably be not lower than about 0.5 MPa, more preferably not lower than about 0.8 MPa in order not to negatively affect other properties of the fiber, such as the adhesion of the coating material to the glass portion of the fiber.

As further observed by the Applicants, when the cured material forming the primary coating of the optical fiber has a Th lower than about −10° C. and a modulus lower than 5.0 MPa, preferably lower than about 4.0 MPa, at said temperature, said control of the microbending phenomena can be further improved.

An analogous improved control of the microbending phenomena can be achieved also when the cured polymeric material has a Th lower than −20° C. and a modulus at said temperature lower than 20 MPa, preferably lower than 15 MPa, or when the cured polymeric material has a Th lower than −30° C. and a modulus at said temperature lower than 70 MPa, preferably lower than 50 MPa.

Furthermore, the glass transition temperature of the cured polymeric material applied as primary coating on an optical fiber according to the invention is preferably not higher than about −30° C., more preferably not higher than −40° C. and much more preferably not higher than −50° C.

All the above indicated parameters, i.e. modulus, Th and Tg can be determined by subjecting a polymeric material to a DMA in tension performed according to the methodology illustrated in the experimental part of the present specification, and by evaluating the respective DMA plot of the material according to the above defined procedure.

A coating material according to the invention is particularly advantageous when applied to fiber design, whenever microbending sensitivity is one of the main constraints in fiber design. This is especially true for temperature below 0° C., as low as −30° C. The improvement in terms of lower microbending sensitivity provides the fiber designer with added margin, which could be exploited in several different manners.

For example, the added margin could increase the tolerances both of fiber production, in terms of microbending sensitivity, and of cable production, in terms of stress over the fibers, without detrimental effects in added losses due to microbending.

Alternatively, or in addition, the added margin could be spent by designing special fibers which show an increased sensitivity to microbending, such as those illustrated hereinafter. Some of the optical parameters of an optical fiber which may affect its microbending sensitivity are the effective area and the refractive index profile (or α-profile). These parameters are well known to those skilled on the art. For instance, reference can be made to WO 01/49624, which describes these and other parameters, also in relation to different kinds of optical fibers.

Figure 1:
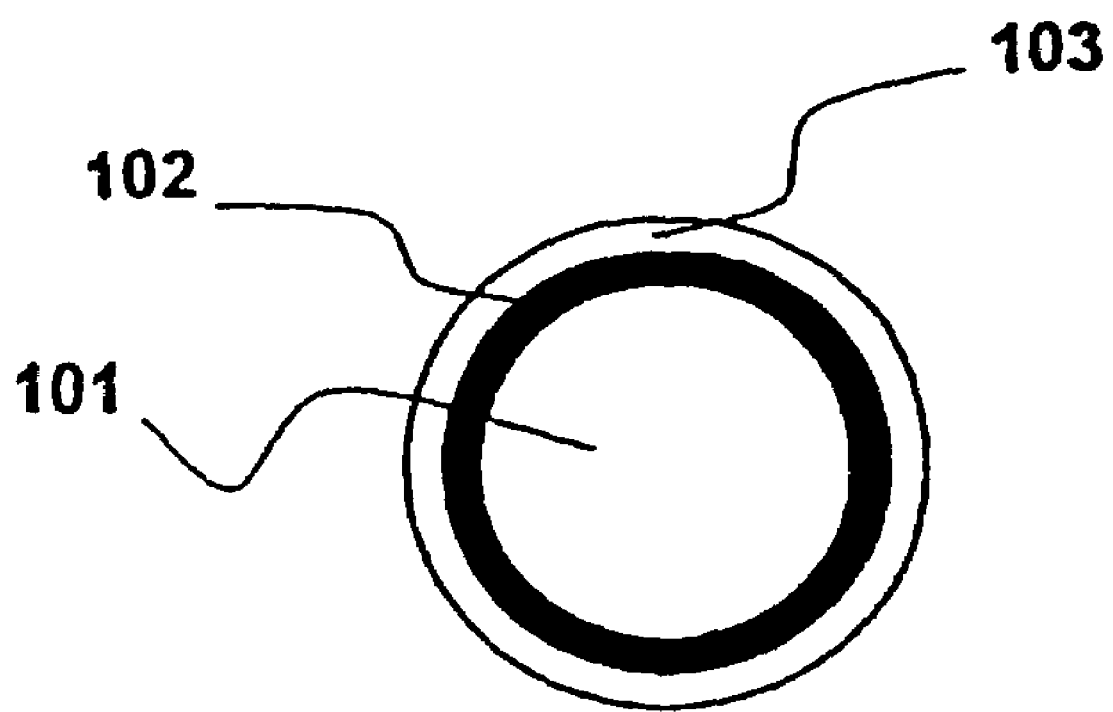
FIG. 1 shows a schematic cross-section of an optical fiber.

FIG. 1, illustrates an optical fiber comprising an internal glass portion 101, a first polymeric coating layer 102, also known as primary coating, disposed to surround said glass portion and a second polymeric coating layer 103, also known as secondary coating, disposed to surround said first polymeric layer.

A first example of advantageous application of the invention can be found in the use of a primary coating material as above described with a very large effective area fiber, having effective area at 1550 nm greater than 90 μm² (as compared with an effective area of about 80 μm² for standard single mode fibers having a refractive index profile of the step-index kind, i.e. a single segment profile, with a single variation of the refractive index of 0.2%–0.4%, a core radius of about 4.0–4.5 μm and a MAC value of about 7.8–8.6).

Fibers having effective area larger than 90 μm$^2$ are currently sold in the market, for example with the commercial name of Vascade™ L1000 by Corning or UltraWave™ SLA by OFS or Z-plus Fiber™ by Sumitomo.

The effective area at 1550 nm for these kind of fibers is preferably above about 100 μm$^2$, more preferably above about 110 μm$^2$, even more preferably above 120 μm$^2$.

Typically, these fibers have a zero dispersion wavelength between about 1270 and 1330 nm and a positive dispersion slope at 1550 nm. The attenuation at 1550 nm is advantageously below 0.200 dB/km, preferably below 0.190 dB/km. The refractive index profile commonly used is of the kind of step-index profile, i.e. a single segment profile. Fiber cutoff is between about 1250 nm and about 1650 nm, preferably between about 1350 nm and about 1550 nm.

One of the main constraint in an attempt to design fibers with effective area greater than 90 μm$^2$ is the existence of a limit value for microbending sensitivity above which the fiber could experience an added loss in cable. As a matter of fact, the attenuation losses caused by microbending increases along with the increase of the value of the effective area. It may thus be appreciated that this kind of optical fibers is particularly advantageous for controlling these attenuation losses.

Another example of advantageous application of the invention consists in the combination of the above primary coating material with the so called "dispersion-shifted" optical fibers, characterized by an effective area at 1550 nm greater than 60 μm$^2$ and a zero dispersion wavelength shifted away from the 1300 nm band.

Dispersion-shifted fibers having effective area larger than 60 μm$^2$ are currently sold in the market, for example with the commercial name of FreeLight™ by Pirelli or TeraLight™ by Alcatel or Submarine LEAF® by Corning.

The effective area at 1550 nm is above about 60 μm$^2$ with preferred value above 70 μm$^2$, more preferably above about 80 μm$^2$.

Typically, these fibers have a zero dispersion wavelength between about 1350 and 1650 nm and a positive dispersion slope at 1550 nm. Preferably, the zero dispersion wavelength is between about 1350 and 1520 nm. The attenuation at 1550 nm is typically below 0.210 dB/km, preferably below 0.200 dB/km.

Because of the relatively complex refractive index profile (as compared to the conventional step-index profile of standard single mode optical fibers), these fibers are more prone to attenuation losses caused by microbending and may thus take advantage from the optical fiber of the invention.

A further example of advantageous application of the new material consists in the combination of the new coating material with a dispersion compensating fiber (DCF).

Dispersion compensating fibers are currently sold in the market, for example with the commercial name of Vascade™ S1000 by Corning or UltraWave™ IDF by OFS or Dispersion Compensating Modules by OFS.

Dispersion compensating fibers are suited to compensate the chromatic dispersion cumulated along the optical line having positive dispersion. They can be classified into two families; one for lumped compensation in compact modules and the other for distributed compensation in cable form.

Dispersion compensating fibers are characterized in that the dispersion at 1550 nm is below –20 ps/nm/km, preferably less than –30 ps/nm/km.

In the art, the chromatic dispersion first derivative with respect to wavelength is called dispersion slope. In order to compensate also the slope of the transmission line, the dispersion slope of DCF is preferably negative.

The first family of DCF is characterized in that the dispersion at 1550 nm is below –80 ps/nm/km, preferably less than –100 ps/nm/km and more preferably below –120 ps/nm/km.

The second family of DCF is characterized in that the dispersion at 1550 nm is below –20 ps/nm/km, preferably less than –40 ps/nm/km and more preferably below –60 ps/nm/km.

The effective area at 1550 nm is above about 15 μm$^2$, preferably above about 20 μm$^2$, more preferably above 25 μm$^2$.

The refractive index profile preferably used for DCF fibers comprises a core and a cladding, wherein the core further comprises a central segment having positive refractive index difference with respect to cladding, a first annular segment having negative index difference and a second annular segment having positive index difference.

As the microbending sensitivity of DCF typically increases with the increase of the dispersion value, it may be appreciated that the fiber designer can in fact take advantage of the decreased microbending sensitivity by lowering the dispersion of the DCF while keeping the remaining fiber optical properties substantially the same. In particular, for a given cutoff, effective area, dispersion to slope ratio, the fiber designer is allowed to decrease the dispersion at 1550 nm while maintaining still acceptable microbending performances.

A further example of advantageous application of the invention is with a multimode optical fiber.

Multimode fibers are currently sold in the market, for example with the commercial name of Infinicor® by Corning or GLight™ by Alcatel.

Multimode fibers found advantageous application in Local Area Network and short reach link, typically below 1 km. The typical core diameter is 50 μm and 65 μm.

Multimode fibers are strongly affected by the phenomenon of microbending because of the mode coupling between the different propagation modes of the fiber. The fibers of the invention thus have increased resistance to losses induced by microbending when placed in cable.

Space saving is becoming a crucial issue in telecommunication applications. For example, in the distribution network environment, the availability of higher fiber count cables or reduced size cables would be very advantageous to cope with the need of connecting great number of users with the constraint to use pre-existent ducts of various kind. Another example of advantage of a reduced diameter fiber and consequently of reduced diameter cable can be represented by aerial cables. In this application, it is mandatory to reduce the overall weight of the cables and their wind resistance.

It should however be noted that while attempting to reduce overall fiber dimensions and weight, it is important to guarantee the full compatibility with existing fibers. Therefore the preferred solution consists in a fiber having a 125 μm diameter glass portion (i.e. similar to the one of conventional fibers), coated by coating layers having reduced overall thickness, e.g. for an overall external diameter of less than or equal to 210 μm.

With reference to FIG. 1, the thickness of the primary coating layer 102 is of from about 18 μm to 28 μm, preferably of about 22–23 μm while the thickness of the secondary coating 103 is of from about 10 μm to about 20 μm, preferably of about 15 μm.

Due to the reduced thickness of protective polymeric layers, this kind of fiber is more prone to the effects of side pressures and thus to attenuation caused by microbending. By using a primary coating material according to the invention, the fiber will thus show acceptable microbending losses also with such a reduction in the protective layer.

The optical fiber of the invention allows to reduce the attenuation losses caused by microbending in an optical fiber disposed within a cable structure, particularly within a polymeric buffer tube. The optical fibers are in fact typically housed in the buffer tubes with an excess length with respect to the length of the tube, in order to avoid mechanical stresses on the optical fibers when the cable is pulled, e.g. during installation. Depending on the dimensions of the buffer tube and on the amount of optical fibers housed therein, said excess length may vary between about 0.1% and 1%. In particular, when the fibers are housed within a so-called "central loose tube," said excess length is typically around 1%, to compensate the longitudinal elongation of the buffer tube. For particular installations however (e.g. local network), where a high fiber count within the same buffer tube is required, said excess fiber length is lowered, e.g. to 0.5% or lower, to avoid possible contacts of the fibers with the internal walls of the tube. For the so-called "stranded loose tubes" structures, where a plurality of buffer tubes is stranded (typically with a S-Z fashion) around a central strength member, the fiber excess length is generally lower, e.g. between 0.1% and 0.5%, as with this kind of structure the optical fibers are less prone to mechanical stresses when the cable is subjected to longitudinal elongation.

In whichever case, attenuation losses may however arise upon temperature decrease, due to the higher shrinkage of the buffer tube with respect to the glass fibers upon temperature decrease. In this case, an excessive meandering of the fibers within the buffer tube will cause to fiber to contact the inner walls of the buffer tube, with consequent microbending. In addition, particularly in the "stranded loose tubes" structure, or in those cases where the fibers are housed with a high fiber count within the buffer tube (i.e. with about 50% or more of the internal cross area of the tube being occupied by the optical fibers) it may happen that the fibers are forced towards the walls of the tube, e.g. as a consequence of a permanent bending of the cable in the installation duct. Also in this case, said contact may give rise to microbending. Similarly, optical fibers (e.g. in the form of optical fiber ribbons) housed within a groove within the so-called "slotted core" structure, may be forced either towards the outer sheath as a consequence of temperature decrease or towards the bottom of the groove as a consequence of a mechanical strain applied onto the cable.

Figure 7:
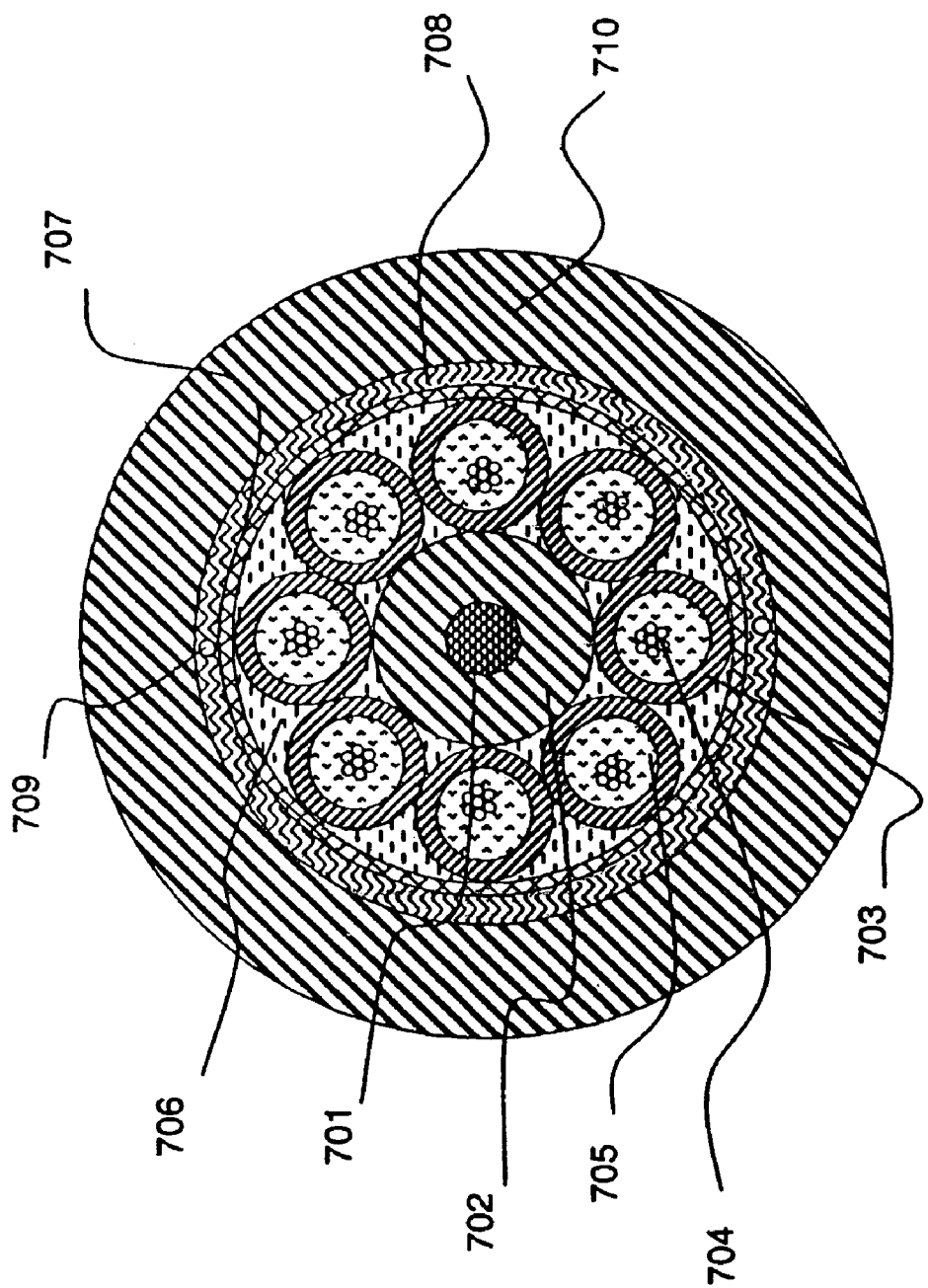
FIGS. 7 to 9 shows different examples of optical cables.
Figure 8:
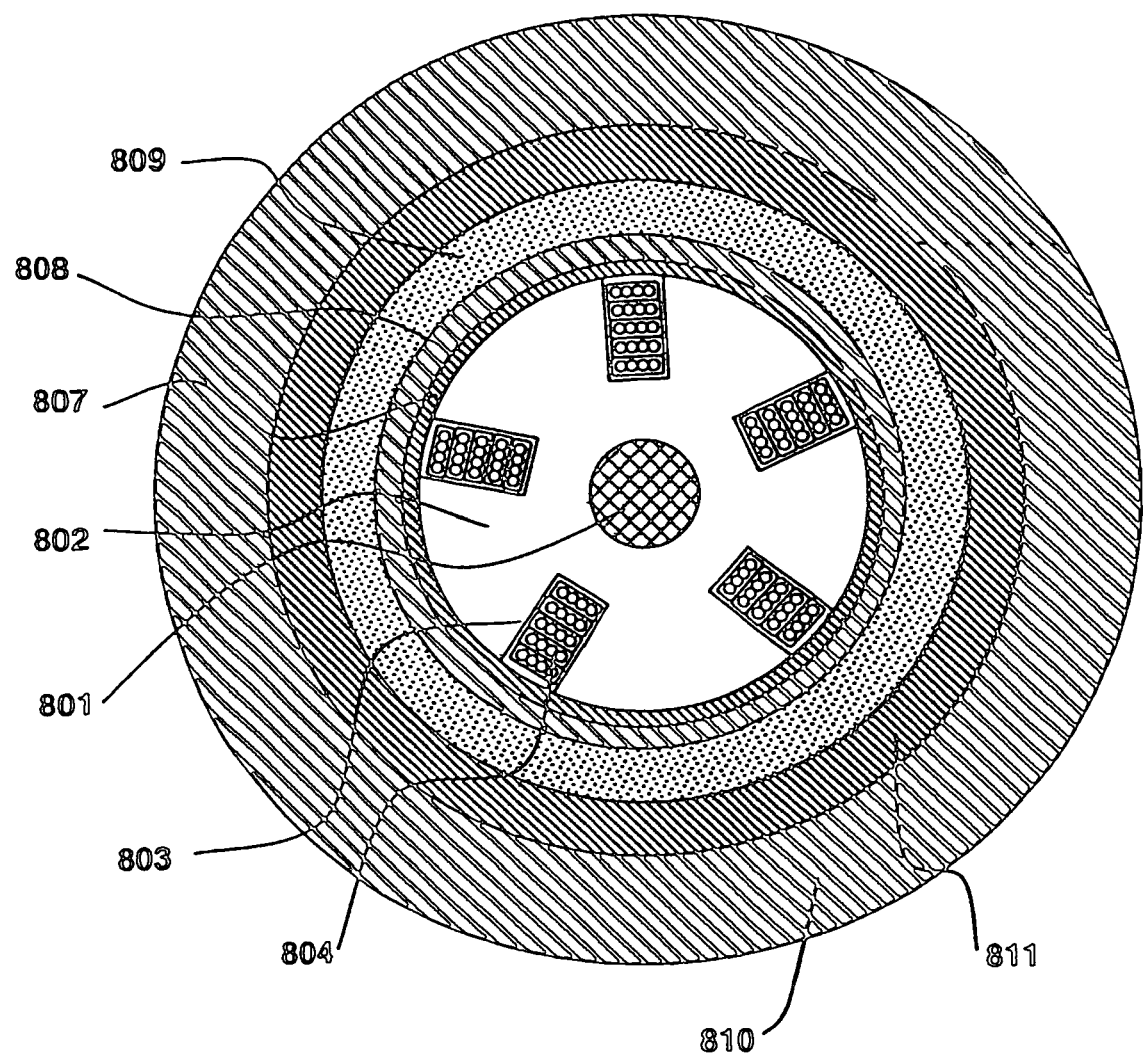
Figure 9:
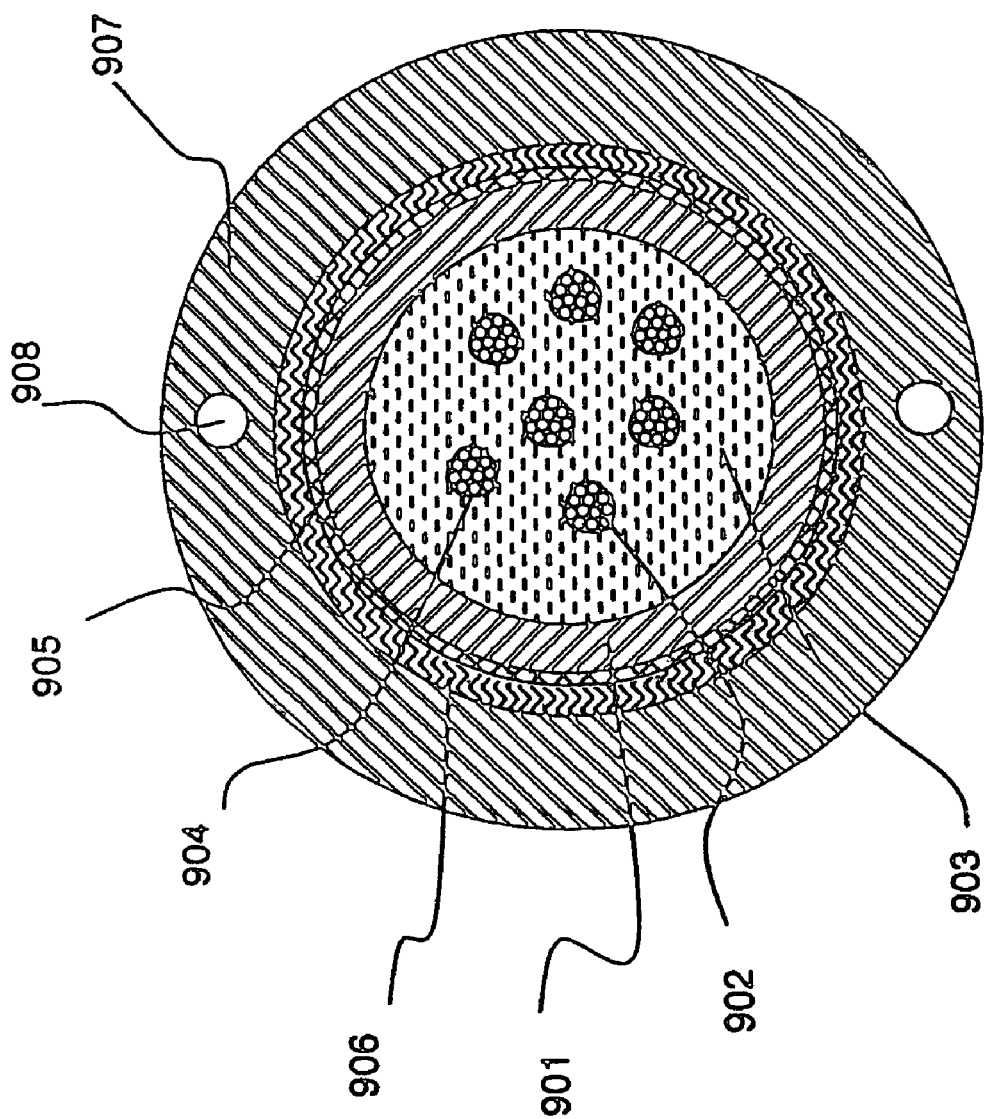

Examples of cable structures wherein the use of said fibers can be advantageous are illustrated in FIGS. 7, 8 and 9.

The cable shown in FIG. 7 has in its radially innermost position a reinforcing element 701, typically made from glass-fiber reinforced plastic, coated with a layer 702 of polymeric material, for instance a polyolefin, e.g. polyethylene or ethylene-propylene copolymer. The cable has one or more polymeric tubular elements 703 ("buffer tubes") which can be made from a polyolefin material (e.g. polyethylene or ethylene-propylene copolymer) said tubes comprising a number of optical fibers 704 which are embedded in a filling material 705, typically of the grease-like type (for instance as disclosed in U.S. Pat. No. 6,278,824).

The optical fibers can be, for example, single-mode fibers, multi-mode fibers, dispersion-shifted (DS) fibers, non-zero dispersion (NZD) fibers, or fibers with a large effective area and the like, depending on the application requirements of the cable.

The number of tubular elements 703 present in the cable (which may also be arranged on several superposed layers) and the dimensions of these tubular elements depend on the intended capacity of the cable, as well as on the conditions under which this cable will be used. For example, six, eight or more tubular elements, arranged in one or more layers (for example up to 48 tubes), can be disposed around the central element.

The tubular elements 703 are disposed in a helical lay around the central member, said lay being either a continuous helix or an open helix obtained by alternate (S-Z) stranding of the tube. If desired, one or more tubes may be replaced by one or more rods, in order to preserve the symmetry of the helical configuration in case the fiber count is lower than the full fiber count. Alternatively, the central element can be replaced by a further tubular element as those previously mentioned, apt to contain optical fibers.

The interstices 706 between the buffer tubes can also be filled with a filling compositions such as those previously mentioned or, preferably, with a composition having a higher viscosity.

Stranded tubes are generally bound together with a polymeric yarn or tape (not shown), e.g. a polyester or polypropylene yarn, in order to held them firmly in their helical configuration during manufacturing processes.

A further polymeric tape (not shown) can be optionally wound with overlapping around the stranded buffer tubes in order to allow an effective containment of the interstitial water-blocking filler. Such polymeric tape, for instance polyester (e.g. Mylar®), has a thickness of about 25 to 50 μm and can be helical wound around the stranded buffer tubes with an overlap of about 3 mm.

A water-blocking (or water swellable) tape 707 can be wound around the whole structure. Such water-blocking tapes generally comprise a polymeric base tape on the surface of which a superabsorbent swellable material (e.g. polyacrylate or polymethylmethacrylate) in the form of powder is chemically or thermally fixed.

The stranded tubes can then be wrapped by a reinforcing layer 708, e.g. made of aramidic yarns (Kevlar®) or glass thread, optionally containing two sheath cutting threads 709 disposed longitudinally with respect to the cable. An outer polymeric layer, e.g. is then disposed to surround the cable structure. Optionally, a metal tape (not shown), preferably corrugated, can be disposed between the outer sheath 710 and the reinforcing layer.

The cable of FIG. 8 shows has in its radially innermost position a reinforcing element 801 on which a polymeric slotted core 802 is extruded. Grooves 803 are formed longitudinally on the outer surface of said core, which grooves extend either as a continuous helix or with an S-Z configuration along the whole outer surface of the said core. The grooves 803 are filled with a filler 804 as the one indicated previously, and optical fibers in the form of ribbons 805 are embedded therein. The slotted core 802 is then wrapped by a containment tape 806, e.g. of polyester, surrounded by a waterbloking tape 807 as the one indicated previously. A polymeric jacket 808, for instance of polyurethane or of a polyolefin material, is disposed to surround the wrapped slotted core. A reinforcing layer 809, e.g. made of aramidic yarns (Kevlar®) or glass thread, can be disposed to surround said polymeric sheath 808, optionally containing two sheath cutting threads (not shown) disposed longitudinally with respect to the cable. An outer polymeric layer, is then disposed to surround the cable structure. Optionally, a metal tape 811, preferably corrugated, can be disposed between the outer sheath 810 and the reinforcing layer.

FIG. 9 shows a cross-sectional view of an optical fiber cable comprising a central polymeric tube 901 (e.g. of polyolefin material), said tube containing a number of optical fibers 902 which are disposed loosely in a filling material 903 as previously mentioned. Groups of e.g. twelve optical fibers can be grouped into sub-units and enveloped by a thin layer of a low tensile modulus polymeric material (e.g. polyvinylchloride, ethylene-vinylacetate polymer, polyethylene or polypropylene) to form a sub-module 904. The polymeric sheath can be colored in order to facilitate the identification of the fibers.

The number of optical elements 904 present (which may also be arranged on several layers) and the dimensions of these elements depend on the intended capacity of the cable, as well as on the conditions under which this cable will be used. For example, both cables with a single optical element 904 and cables with six, eight or more optical elements, arranged in one or more layers (for example up to 48 tubes), are envisaged.

The optical elements may be arranged into the inner tube 901 in a continuous or in an open helix (S-Z) pattern around the axis of the cable.

Around the buffer tube 901 a water blocking tape 905 as previously described can be wound in a helical lay. A reinforcing layer 906 can be disposed around the water-blocking tape and an outer polyethylene sheath 907 is then disposed to surround the cable structure.

One or more reinforcing members 908 arranged longitudinally along the cable are inserted in the thickness of the said outer tubular sheath 907. In one preferred embodiment, as illustrated in FIG. 3, two reinforcing members 908 are present, advantageously arranged diametrically opposite each other. In addition, a reinforcing member can be alternatively or additionally placed inside the inner tube 901 in an axial position.

These members are preferably completely immersed in the said sheath and preferably consist of reinforcing rods of high-strength material, typically between 0.5 and 2.5 mm in size. Said reinforcing members can be made of a composite material, such as glass resin or reinforced carbon fiber resin or aramide yarns (Kevlar®), or alternatively of a metallic material such as steel and the like.

Alternatively, the tube 901 can be omitted and thus a single tubular polymeric sheath 907 can carry out the twofold function of an outer protective sheath and an inner tube.

Radiation-curable carrier systems which are suitable for forming a composition to be used as primary coating in an optical fiber according to the invention contain one or more radiation-curable oligomers or monomers (reactive diluents) having at least one functional group capable of polymerization when exposed to actinic radiation. Suitable radiation-curable oligomers or monomers are now well known and within the skill of the art. Commonly, the radiation-curable functionality used is ethylenic unsaturation, which can be polymerized preferably through radical polymerization. Preferably, at least about 80 mole %, more preferably, at least about 90 mole %, and most preferably substantially all of the radiation-curable functional groups present in the oligomer are acrylate or methacrylate. For the sake of simplicity, the term "acrylate" as used throughout the present application covers both acrylate and methacrylate functionality.

A primary coating according to the present invention can be made from a radiation curable coating composition comprising a radiation curable oligomer, said oligomer comprising a backbone derived from polypropylene glycol and a dimer acid based polyester polyol. Preferably, the oligomer is a urethane acrylate oligomer comprising said backbone, more preferably a wholly aliphatic urethane acrylate oligomer. Said oligomer is disclosed, for instance, in WO 01/05724. The oligomer can be made according to methods that are well known in the art. Preferably, the urethane acrylate oligomer can be prepared by reacting (A1) the polypropylene glycol, and
(A2) the dimer acid based polyester polyol,
(B) a polyisocyanate, and
(C) a (meth)acrylate containing a hydroxyl group.

Given as examples of the process for manufacturing the urethane acrylate by reacting these compounds are (i) reacting said glycol (A1 and A2), the polyisocyanate, and the hydroxyl group-containing (meth)acrylate altogether; or (ii) reacting said glycol and the polyisocyanate, and reacting the resulting product with the hydroxyl group-containing (meth)acrylate; or (iii) reacting the polyisocyanate and the hydroxyl group-containing (meth)acrylate, and reacting the resulting product with said glycol; or (iv) reacting the polyisocyanate and the hydroxyl group-containing (meth)acrylate, reacting the resulting product with said glycol, and reacting the hydroxyl group-containing (meth)acrylate once more.

Polypropylene glycol (A1)—as used herein—is understood to refer to a polypropylene glycol comprising composition having a plurality of polypropylene glycol moieties. Preferably, said polypropylene glycol has on average a number average molecular weight ranging from 1,000 to 13,000, more preferably ranging from 1,500 to 8,000, even more preferred from 2,000 to 6,000, and most preferred from 2,500 to 4,500. According to a preferred embodiment, the amount of unsaturation (referred to the meq/g unsaturation for the total composition) of said polypropylene glycol is less than 0.01 meq/g, more preferably between 0.0001 and 0.009 meq/g.

Polypropylene glycol includes 1,2-polypropylene glycol, 1,3-polypropylene glycol and mixtures thereof, with 1,2-polypropylene glycol being preferred. Suitable polypropylene glycols are commercially available under the trade names of, for example, Voranol P1010, P 2001 and P 3000 (supplied by Dow), Lupranol 1000 and 1100 (supplied by Elastogran), ACCLAIM 2200, 3201, 4200, 6300, 8200, and Desmophen 1111 BD, 1112 BD, 2061 BD, 2062 BD (all manufactured by Bayer), and the like. Such urethane compounds may be formed by any reaction technique suitable for such purpose.

Dimer acid based polyester polyol (A2)—as used herein—is understood to refer to a hydroxyl-terminated polyester polyol which has been made by polymerizing an acid-component and a hydroxyl-component and which has dimer acid residues in its structure, wherein said dimer acid residues are residues derived from the use of a dimer acid as at least part of the acid-component and/or by the use of the diol derivative of a dimer acid as at least part of the hydroxyl-component.

Dimer acids (and esters thereof) are a well known commercially available class of dicarboxylic acids (or esters).

They are normally prepared by dimerizing unsaturated long chain aliphatic monocarboxylic acids, usually of 13 to 22 carbon atoms, or their esters (e.g. alkyl esters). The dimerization is thought by those in the art to proceed by possible mechanisms which include Diels-Alder, free radical, and carbonium ion mechanisms. The dimer acid material will usually contain 26 to 44 carbon atoms. Particularly, examples include dimer acids (or esters) derived from C-18 and C-22 unsaturated monocarboxylic acids (or esters) which will yield, respectively, C-36 and C-44 dimer acids (or esters). Dimer acids derived from C-18 unsaturated acids, which include acids such as linoleic and linolenic are particularly well known (yielding C-36 dimer acids).

The dimer acid products will normally also contain a proportion of trimer acids (e.g. C-54 acids when using C-18 starting acids), possibly even higher oligomers and also small amounts of the monomer acids. Several different grades of dimer acids are available from commercial sources and these differ from each other primarily in the amount of monobasic and trimer acid fractions and the degree of unsaturation.

Usually the dimer acid (or ester) products as initially formed are unsaturated which could possibly be detrimental to their oxidative stability by providing sites for crosslinking or degradation, and so resulting in changes in the physical properties of the coating films with time. It is therefore preferable (although not essential) to use dimer acid products which have been hydrogenated to remove a substantial proportion of the unreacted double bonds.

Herein the term "dimer acid" is used to collectively convey both the diacid material itself or ester-forming derivatives thereof (such as lower alkyl esters) which would act as an acid component in polyester synthesis and includes (if present) any trimer or monomer.

The dimer acid based polyester polyol preferably has on average a number average molecular weight ranging from 1,000 to 13,000, more preferably ranging from 1,500 to 8,000, even more preferred from 2,000 to 6,000, and most preferred from 2,500 to 4,000.

Examples of these dimer acid based polyester polyols are given in EP 0 539 030 B1 which polyols are incorporated herein by reference. As commercially available products, Priplast 3190, 3191, 3192, 3195, 3196, 3197, 3198, 1838, 2033 (manufactured by Uniqema), and the like can be given.

The ratio of polypropylene glycol to dimer acid based polyester polyol in the oligomer may be ranging from 1:5 to 5:1, preferably ranging from 1:4 to 4:1, and more preferably ranging from 1:2 to 2:1, even more preferably, polypropylene glycol and dimer acid based polyester polyol are present in an equimolar ratio.

Given as examples of the polyisocyanate (B) are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred isocyanates are tolylene di-isocyanate, isophorone di-isocyanate, and methylene-bis (4-cyclohexylisocyanate). Most preferred are wholly aliphatic based polyisocyanate compounds, such as isophorone di-isocyanate, and methylene-bis (4-cyclohexyl isocyanate).

Examples of the hydroxyl group-containing acrylate (C) include, (meth)acrylates derived from (meth)acrylic acid and epoxy and (meth)acrylates comprising alkylene oxides, more in particular, 2-hydroxyethyl(meth)acrylate, 2-hydroxypropylacrylate and 2-hydroxy-3-oxyphenyl(meth)acrylate. Acrylate functional groups are preferred over methacrylates.

The ratio of the polyol (A) [said polyol (A) comprising (A1) and (A2)], the polyisocyanate (B), and the hydroxyl group-containing acrylate (C) used for preparing the urethane acrylate is determined so that 1.1 to 3 equivalents of an isocyanate group included in the polyisocyanate and 0.1 to 1.5 equivalents of a hydroxyl group included in the hydroxyl group-containing (meth)acrylate are used for one equivalent of the hydroxyl group included in the polyol.

The number average molecular weight of the urethane (meth)acrylate oligomer used in the composition of the present invention is preferably in the range from 1200 to 20,000, and more preferably from 2,200 to 10,000. If the number average molecular weight of the urethane (meth)acrylate is less than 100, the resin composition tends to solidify; on the other hand, if the number average molecular weight is larger than 20,000, the viscosity of the composition becomes high, making handling of the composition difficult.

The urethane (meth)acrylate oligomer is preferably used in an amount from 10 to 90 wt %, more preferably from 20 to 80 wt %, even more preferably from 30 to 70 wt. %, and most preferred from 40 to 70 wt. % of the total amount of the resin composition. When the composition is used as a coating material for optical fibers, the range from 20 to 80 wt. % is particularly preferable to ensure excellent coatability, as well as superior flexibility and long-term reliability of the cured coating.

A radiation-curable composition according to the invention may also contain one or more reactive diluents (B) that are used to adjust the viscosity. The reactive diluent can be a low viscosity monomer having at least one functional group capable of polymerization when exposed to actinic radiation. This functional group may be of the same nature as that used in the radiation-curable oligomer. Preferably, the functional group of each reactive diluent is capable of copolymerizing with the radiation-curable functional group present on the other radiation-curable diluents or oligomer. The reactive diluents used can be mono- and/or multifunctional, preferably (meth)acrylate functional.

A suitable radiation-curable primary coating composition comprises from about 1 to about 80 wt. % of at least one radiation-curable diluent. Preferred amounts of the radiation-curable diluent include from about 10 to about 60 wt. %, more preferably from about 20 to about 55 wt. %, even more preferred ranging from 25 to 40 wt. %, based on the total weight of the coating composition.

Generally, each reactive diluent has a molecular weight of less than about 550 and a viscosity of less than about 500 mPa·s For example, the reactive diluent can be a monomer or a mixture of monomers having an acrylate or vinyl ether functionality and a $C_4$–$C_{20}$ alkyl or polyether moiety. Examples of acrylate functional monofunctional diluents are acrylates containing an alicyclic structure such as isobornyl acrylate, bornyl acrylate, dicyclopentanyl acrylate, cyclohexyl acrylate, and the like, 2-hydroxyethyl acrylate, 2-hydroxypropyl acrylate, 2-hydroxybutyl acrylate, methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, stearyl acrylate, isostearyl acrylate, tetrahydrofurfuryl acrylate, butoxyethyl acrylate, ethoxydiethylene glycol acrylate, benzylacrylate, phenoxyethylacrylate, polyethylene glycol monoacrylate, polypropylene glycol monoacrylate, methoxyethylene glycol acrylate, ethoxyethyl acrylate, methoxypolyethylene glycol acrylate, methoxypropylene glycol acrylate, dimethylaminoethyl acrylate, diethylaminoethyl acrylate, 7-amino-3,7-dimethyloctyl acrylate, acrylate monomers shown by the following formula (1),

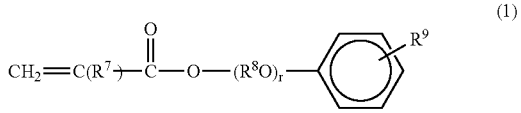

(1)

wherein $R^7$ is a hydrogen atom or a methyl group, $R^8$ is an alkylene group having 2-6, and preferably 2–4 carbon atoms, $R^9$ is a hydrogen atom or an organic group containing 1–12 carbon atoms or an aromatic ring, and r is an integer from 0 to 12, and preferably from 1 to 8.

Of these, in order to obtain a cured polymeric material having a suitably low hardening temperature and a suitably low modulus at said temperature, long aliphatic chain-substituted monoacrylates, such as, for example decyl acrylate, isodecyl acrylate, tridecyl acrylate, lauryl acrylate, and the like, are preferred and alkoxylated alkyl phenol acrylates, such as ethoxylated and propoxylated nonyl phenol acrylate are further preferred.

Examples of non-acrylate functional monomer diluents are N-vinylpirrolidone, N-vinyl caprolactam, vinylimidazole, vinylpyridine, and the like.

These N-vinyl monomers preferably are present in amounts between about 1 and about 20% by weight, more preferably less than about 10% by weight, even more preferred ranging from 2 to 7% by weight.

According to a preferred embodiment, the polymeric material applied as primary coating according to the invention is made from a radiation curable composition comprising at least one monofunctional reactive diluent (having an acrylate or vinyl ether functionality), said monofunctional diluent(s) being present in amounts ranging from 10 to 50 wt. %, preferably ranging from 20 to 40 wt. %, more preferably from 25 to 38 wt. %. The amount of monoacrylate functional reactive diluents preferably ranges from 10 to 40 wt. %, more preferably from 15 to 35 wt. % and most preferred from 20 to 30 wt. %.

The reactive diluent can also comprise a diluent having two or more functional groups capable of polymerization. Examples of such monomers include: $C_2$–$C_{18}$ hydrocarbondiol diacrylates, $C_4$–$C_{18}$ hydrocarbon divinylethers, $C_3$–$C_{18}$ hydrocarbon triacrylates, and the polyether analogues thereof, and the like, such as 1,6-hexanedioldiacrylate, trimethylolpropane triacrylate, hexanediol divinylether, triethyleneglycol d iacrylate, pentaerythritol triacrylate, ethoxylated bisphenol-A diacrylate, and tripropyleneglycol diacrylate.

Such multifunctional reactive diluents are preferably (meth)acrylate functional, preferably difunctional (component (B1)) and trifunctional (component (B2)).

Preferably, alkoxylated aliphatic polyacrylates are used, such as ethoxylated hexanedioldiacrylate, propoxylated glyceryl triacrylate or propoxylated trimethylol propane triacrylate.

Preferred examples of diacrylates are alkoxylated aliphatic glycol diacrylate, more preferably, propoxylated aliphatic glycol diacrylate. A preferred example of a triacrylate is trimethylol propane triacrylate.

According to a preferred embodiment the polymeric material applied as primary coating on an optical fiber according to the invention is made from a radiation curable which comprises, a multifunctional reactive diluent amounts ranging from 0.5–10 wt. %, more preferably ranging from 1 to 5 wt. %, and most preferred from 1.5 to 3 wt. %.

Without being bound to any particular theory, the present inventors believe that the combination of the oligomer according to the present invention in amounts of less than about 75 wt. % (preferably less than about 70 wt. %) with a total amount of monofunctional reactive diluents of at least about 15 wt. % (more preferably, at least about 20 wt. %, even more preferably at least about 25 wt. % and most preferred at least about 30 wt. %) aids in achieving a primary coating composition, that after cure, has an acceptably low hardening temperature and low modulus at said temperature.

It is further preferred that the composition comprises a mixture of at least two monofunctional reactive diluents, more preferably, one of said reactive diluents being substituted with a long aliphatic chain; even more preferably, the composition contains two long aliphatic chain-substituted monoacrylates. Preferably, at least about 10 wt. %, more preferably at least about 12 wt. % is present of said at least one long aliphatic chain-substituted monoacrylate.

A liquid curable resin composition suitable to be applied as a primary coating layer on an optical fiber according to the present invention can be cured by radiation. Here, radiation includes infrared radiation, visible rays, ultraviolet radiation, X-rays, electron beams, α-rays, β-rays, γ-rays, and the like. Visible and UV radiation are preferred.

The liquid curable resin composition suitable to be applied as a primary coating layer on an optical fiber according to the present invention preferably comprises a photo-polymerization initiator. In addition, a photosensitizer can added as required. Given as examples of the photo-polymerization initiator are 1-hydroxycyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide, bis-(2,4,6-trimethylbenzoyl)-phenylphosphine oxide and the like.

Examples of commercially available products of the photo-polymerization initiator include IRGACURE 184, 369, 651, 500, 907, CGI1700, 1750, 1850, 819, Darocur I116, 1173 (manufactured by Ciba Specialty Chemicals Co., Ltd.), Lucirin LR8728 (manufactured by BASF), Ubecryl P36 (manufactured by UCB), and the like.

The amount of the polymerization initiator used can range from 0.1 to 10 wt %, and preferably from 0.5 to 7 wt %, of the total amount of the components for the resin composition.

In addition to the above-described components, various additives such as antioxidants, UV absorbers, light stabilizers, silane coupling agents, coating surface improvers, heat polymerization inhibitors, leveling agents, surfactants, colorants, preservatives, plasticizers, lubricants, solvents, fillers, aging preventives, and wettability improvers can be used in the liquid curable resin composition of the present invention, as required. Examples of antioxidants include Irganox 1010, 1035, 1076, 1222 (manufactured by Ciba Specialty Chemicals Co., Ltd.), Antigene P, 3C, FR, Sumilizer GA-80 (manufactured by Sumitomo Chemical Industries Co., Ltd.), and the like; examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Sypro Chemical Co., Ltd.), and the like; examples of light stabilizers include Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.), and the like; examples of silane coupling agents include aminopropyltriethoxysilane, mercaptopropyltrimethoxy-silane, and methacryloxypropyltrimethoxysilane, and commercially available products such as SH6062, SH6030 (manufactured by Toray-Dow Corning Silicone Co., Ltd.), and KBE903, KBE603, KBE403 (manufactured by Shin-Etsu Chemical Co., Ltd.).

The viscosity of the liquid curable resin composition applied as a primary coating layer on an optical fiber according to the present invention is usually in the range from 200 to 20,000 cP, and preferably from 2,000 to 15,000 cP.

The primary coating compositions suitable to be applied as a primary coating layer on an optical fiber according to the present invention, when cured, typically have an elongation-at-break of greater than 80%, more preferably of at least 110%, more preferably at least 150% but not typically higher than 400%.

The compositions suitable to be applied as a primary coating layer on an optical fiber according to the present invention will preferably have a cure speed of 1.0 J/cm$^2$ (at 95% of maximum attainable modulus) or less, more preferably about 0.7 J/cm$^2$ or less, and more preferably, about 0.5 J/cm$^2$ or less, and most preferred, about 0.4 J/cm$^2$ or less.

An optical fiber according to the invention comprises a second layer of polymeric material (secondary coating) which is disposed to surround said primary coating. Preferably, the polymeric material of said secondary coating is also based on a radiation curable composition. The afore-described primary coating is then in turn coated with a secondary coating, of a type known in the art, compatible with the primary coating formulation. For example, if the primary coating has an acrylic base, the secondary coating will also preferably have an acrylic base.

Typically, an acrylic based secondary coating comprises at least one oligomer with acrylate or methacrylate terminal groups, at least one acrylic diluent monomer and at least one photoinitiator.

The oligomer represents generally 40–80% of the formulation by weight. The oligomer commonly consists of a polyurethaneacrylate.

The polyurethaneacrylate is prepared by reaction between a polyol structure, a polyisocyanate and a monomer carrying the acrylic function.

The molecular weight of the polyol structure is indicatively between 500 and 6000 u.a.; it can be entirely of hydrocarbon, polyether, polyester, polysiloxane or fluorinated type, or be a combination thereof. The hydrocarbon and polyether structure and their combinations are preferred. A structure representative of a polyether polyol can be, for example, polytetramethylene oxide, polymethyltetramethylene oxide, polymethylene oxide, polypropylene oxide, polybutylene oxide, their isomers and their mixtures. Structures representative of a hydrocarbon polyol are polybutadiene or polyisobutylene, completely or partly hydrogenated and functionalized with hydroxyl groups.

The polyisocyanate can be of aromatic or aliphatic type, such as, for instance, a polyisocyanate (B) as previously described.

The monomer carrying the acrylic function comprises groups able to react with the isocyanic group. Said monomer can be selected, for instance, among the hydroxyl group-containing acrylates (C) as previously illustrated.

The epoxyacrylate is prepared by reacting the acrylic acid with a glycidylether of an alcohol, typically bisphenol A or bisphenol F.

The diluent monomer represents 20–50% of the formulation by weight, its main purpose being to cause the formulation to attain a viscosity of about 5 Pas at the secondary coating application temperature. The diluent monomer, carrying the reactive function, preferably of acrylic type, has a structure compatible with that of the oligomer. The acrylic function is preferred. The diluent monomer can contain an alkyl structure, such as isobornylacrylate, hexanediacrylate, dicyclopentadiene-acrylate, trimethylolpropane-triacrylate, or aromatic such as nonylphenyletheracrylate, polyethyleneglycol-phenyletheracrylate and acrylic derivatives of bisphenol A.

A photoinitiator, such as those previously illustrated is preferably added to the composition. Further additives, such as inhibitors inhibiting polymerization by the effect of temperature, light stabilizers, leveling agents and detachment promoters can also be added A typical formulation of a cross-linkable system for secondary coatings comprises about 40–70% of polyurethaneacrylate, epoxyacrylate or their mixtures, about 30–50% of diluent monomer, about 1–5% of photoinitiator and about 0.5–5% of other additives.

An example of a formulation usable as the secondary coating of the invention is that marketed under the name of DeSolite® 3471-2-136 (DSM). The fibers obtained thereby can be used either as such within optical cables, or can be combined, for example in ribbon form, by incorporation into a common polymer coating, of a type known in the art (such as Cablelite® 3287-9-53, DSM), to be then used to form an optical cable.

Typically, the polymeric material forming the secondary coating has a modulus E' at 25° C. of from about 1000 MPa to about 2000 MPa and a glass transition temperature (measured as above defined) higher than about 30° C., preferably higher than 40° C. and more preferably higher than about 50° C.

Figure 6:
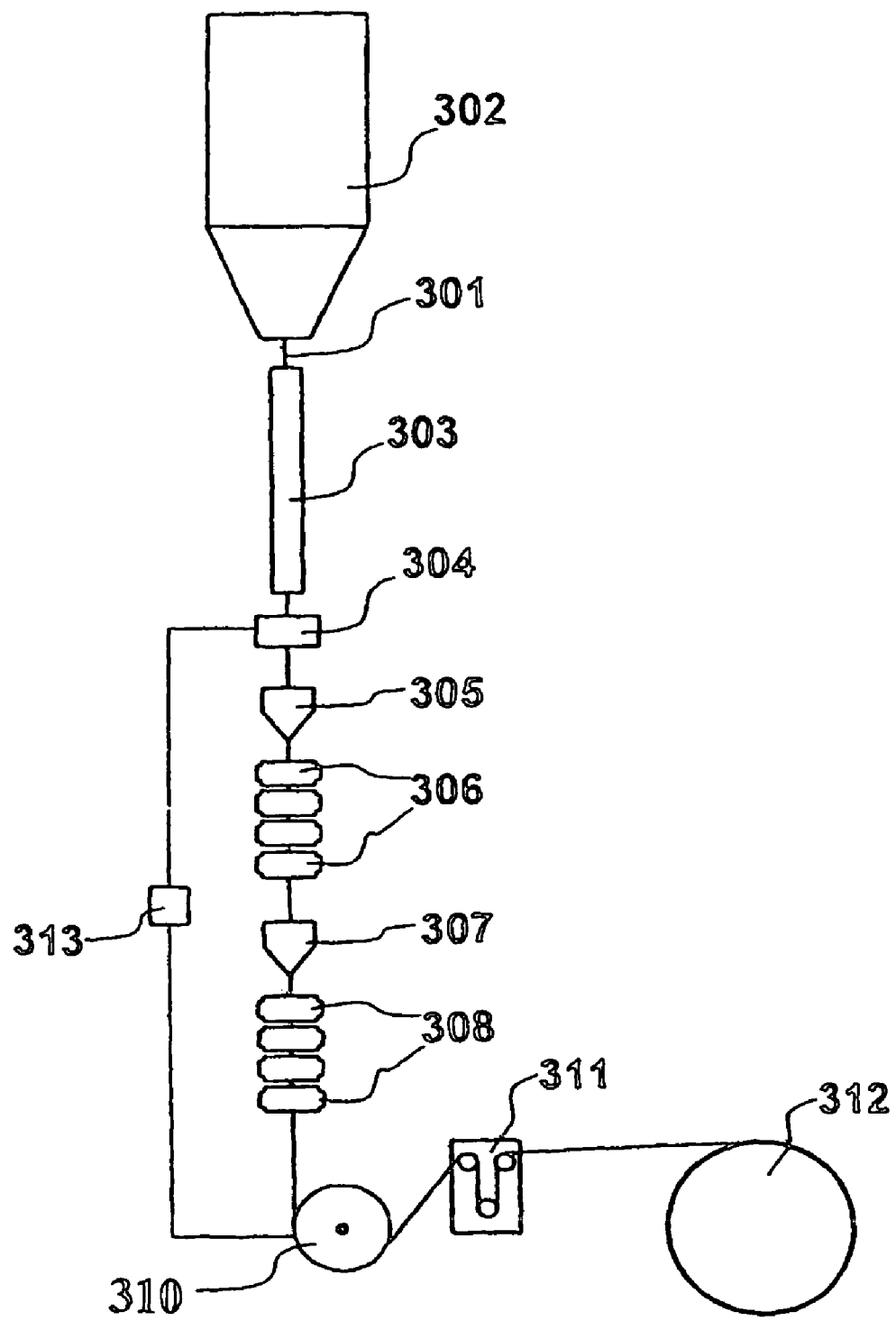
FIG. 6 shows an illustrative embodiment of a drawing tower for manufacturing an optical fiber.

An optical fiber according to the present invention may be produced according to the usual drawing techniques, using, for example, a system such as the one schematically illustrated in FIG. 6.

This system, commonly known as "drawing tower," typically comprises a furnace (302) inside which a glass optical preform to be drawn is placed. The bottom part of the said preform is heated to the softening point and drawn into an optical fiber (301). The fiber is then cooled, preferably to a temperature of at least 60° C., preferably in a suitable cooling tube (303) of the type described, for example, in patent application WO 99/26891, and passed through a diameter measurement device (304). This device is connected by means of a microprocessor (313) to a pulley (310) which regulates the spinning speed; in the event of any variation in the diameter of the fiber, the microprocessor (313) acts to regulate the rotational speed of the pulley (310), so as to keep the diameter of the optical fiber constant. Then, the fiber passes through a primary coating applicator (305), containing the coating composition in liquid form, and is covered with this composition to a thickness of about 25 µm–35 µm. The coated fiber is then passed through a UV oven (or a series of ovens) (306) in which the primary coating is cured. The fiber coated with the cured primary coating is then passed through a second applicator (307), in which it is coated with the secondary coating and then cured in the relative UV oven (or series of ovens) (308). Alternatively, the application of the secondary coating may be carried out directly on the primary coating before the latter has been cured, according to the "wet-on-wet" technique. In this case, a single applicator is used, which allows the sequential application of the two coating layers, for example, of the type described in patent U.S. Pat. No. 4,474,830. The fiber thus coated is then cured using one or more UV ovens similar to those used to cure the individual coatings.

Subsequent to the coating and to the curing of this coating, the fiber may optionally be caused to pass through a device capable of giving a predetermined torsion to this fiber, for example of the type described in international patent application WO 99/67180, for the purpose of reducing the PMD ("Polarization Mode Dispersion") value of this fiber. The pulley (310) placed downstream of the devices illustrated previously controls the spinning speed of the fiber. After this drawing pulley, the fiber passes through a device (311) capable of controlling the tension of the fiber, of the type described, for example, in patent application EP 1 112 979, and is finally collected on a reel (312).

An optical fiber thus produced may be used in the production of optical cables. The fiber may be used either as such or in the form of ribbons comprising several fibers combined together by means of a common coating.

EXAMPLES

The present invention will be explained in more detail below by way of examples, which are not intended to be limiting of the present invention.

Coating Compositions

Coating compositions have been prepared to be applied as primary coating on optical fibers. The compositions to be applied as a primary coating on an optical fiber according to the invention are indicated as Ex. 1, Ex. 2 and Ex. 3 in the following table 1.

TABLE 1

Radiation curable primary coating compositions

|  | Ex. 1 (Wt. %) | Ex. 2 (Wt. %) | Ex. 3 (Wt. %) |
|---|---|---|---|
| Oligomer I | 68.30 | 60.30 | 67.30 |
| Ethoxylated nonyl phenol acrylate | 10.00 | 19.00 | 10.00 |
| Tridecyl acrylate | 10.00 | 10.00 | 10.00 |
| Long aliphatic chain-substituted monoacrylate | 2.00 | 2.00 | 2.00 |

TABLE 1-continued

Radiation curable primary coating compositions

|  | Ex. 1 (Wt. %) | Ex. 2 (Wt. %) | Ex. 3 (Wt. %) |
|---|---|---|---|
| Vinyl caprolactam | 5.00 | 6.00 | 5.00 |
| Ethoxylated bisphenol A diacrylate | 1.00 | — | 3.00 |
| Trimethylol propane triacrylate (TMPTA) | 1.00 | — | — |
| 2,4,6-trimethylbenzoyl diphenyl phosphine oxide | 1.40 | 1.40 | 1.40 |
| Thiodiethylene bis [3-(3,5-di-tert-butyl-4-hydroxyphenyl) propionate]) hydrocinnamate | 0.30 | 0.30 | 0.30 |
| γ-mercapto propyl trimethoxysilane | 1.00 | 1.00 | 1.00 |

Oligomer I is the reaction product of isophorone diisocyanate (IPDI), 2-hydroxyethylacrylate (HEA), polypropylene glycol (PPG) and a dimer acid based polyester polyol.

In addition, comparative commercial primary coating DeSolite® 3471-1-129 (Comp. A in table 2) has also been tested.

The equilibrium modulus, the Tg, the Th and the modulus at the Th for each of the above cured primary coating compositions were as given in Table 2 (see test method section for details on DMA test and determination of respective parameters on the DMA curve). The corresponding DMA curves of said cured coating compositions are reported in FIGS. 4A to 4C, respectively.

TABLE 2

Parameters of cured primary coating compositions

| Ex. | Tg | Th | E' | E' (Th) |
|---|---|---|---|---|
| 1 | −59.1 | −12.2 | 1.1 | 3.5 |
| 2 | −56.6 | −10.8 | 0.7 | 2.0 |
| 3 | −63.2 | −13.3 | 1.1 | 2.7 |
| Comp. A | −55.1 | −5.6 | 1.9 | 3.6 |

Test Methods and Methods of Manufacturing

Curing of the Primary Coatings for Mechanical Testing (Sample Preparation)

A drawdown of the material to be tested was made on a glass plate and cured using a UV processor in inert atmosphere (with a UV dose of 1 J/cm$^2$, Fusion D-lamp measured with EIT Uvicure or International Light IL 390 B Radiometer). The cured film was conditioned at 23±2° C. and 50±5% RH for a minimum of 16 hours prior to testing.

A minimum of 6 test specimens having a width of 12.7 mm and a length of 12.5 cm were cut from the cured film.

Dynamic Mechanical Testing

The DMA testing has been carried out in tension according to the following methodology.

Test samples of the cured coating compositions of examples 1–3 and of comparative experiment A were measured using a Rheometrics Solids Analyzer (RSA-11), equipped with:

1) a personal computer having a Windows operating system and having RSI Orchestrator® software (Version V.6.4.1) loaded, and 2) a liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −90° C. and increasing the temperature at about 2° C./minute until the temperature reached about 100° C. to about 120° C. The test frequency used was 1.0 radian/second. In a DMTA measurement, which is a dynamic measurement, the following moduli are measured: the storage modulus E' (also referred to as elastic modulus), and the loss modulus E" (also referred to as viscous modulus). The lowest value of the storage modulus E' in the DMTA curve in the temperature range between 10 and 100° C. measured at a frequency of 1.0 radian/second under the conditions as described in detail above is taken as the equilibrium modulus of the coating.

Figure 4A:
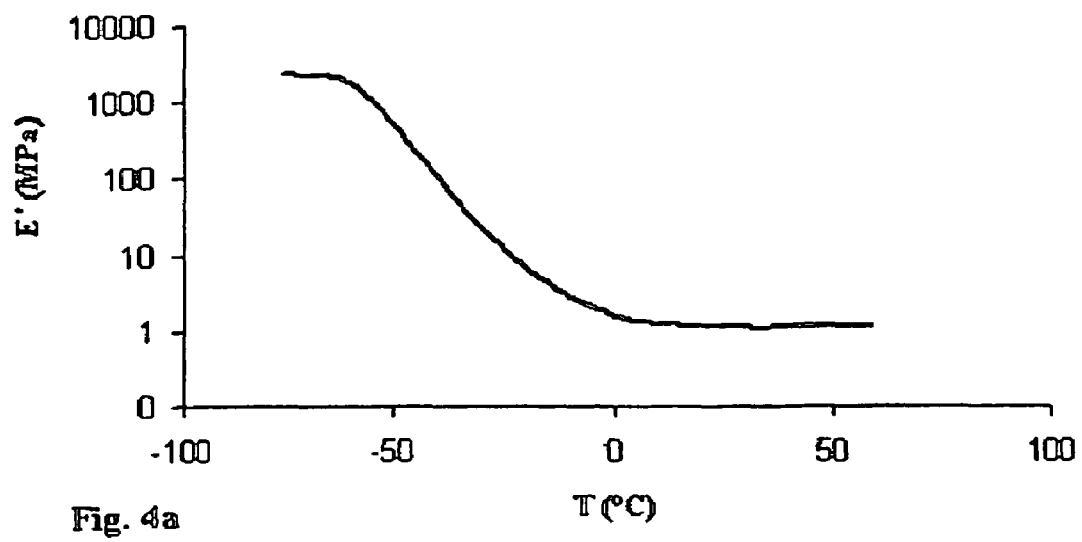
FIG. 4a to 4c show the experimental DMA plots of three primary coating materials suitable for an optical fiber according to the invention.
Figure 4B:
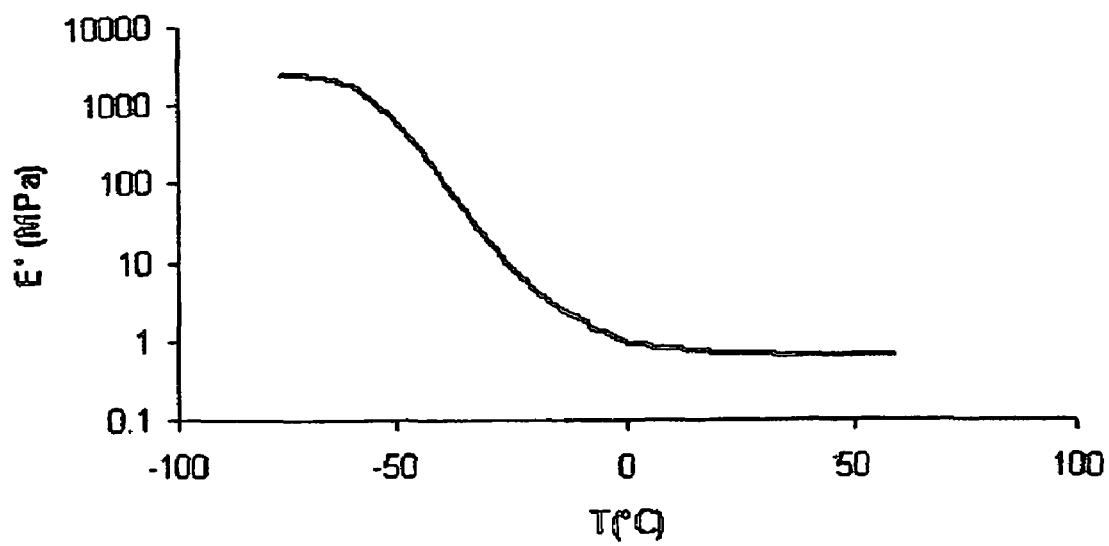
Figure 4C:
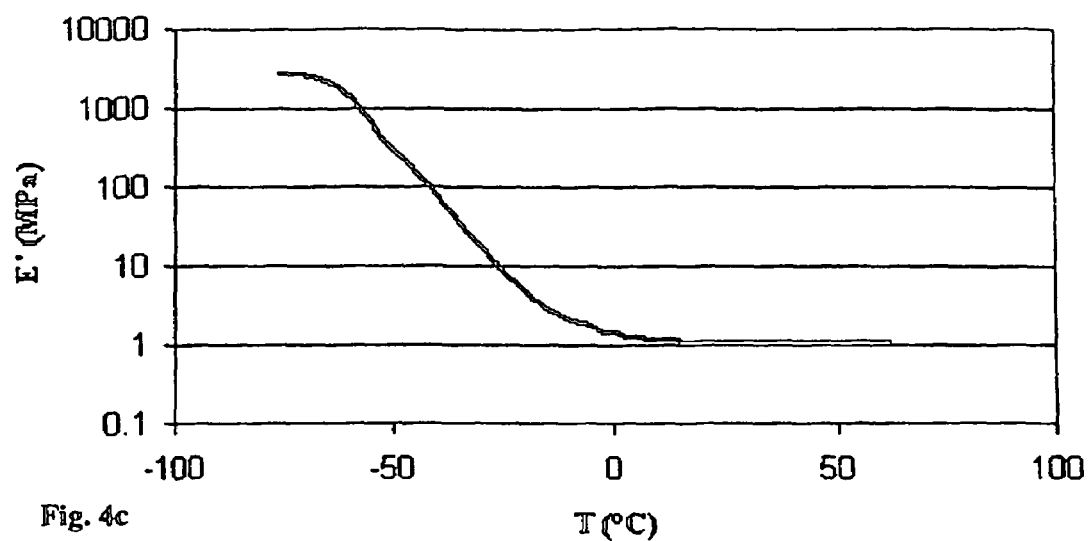
Figure 5:
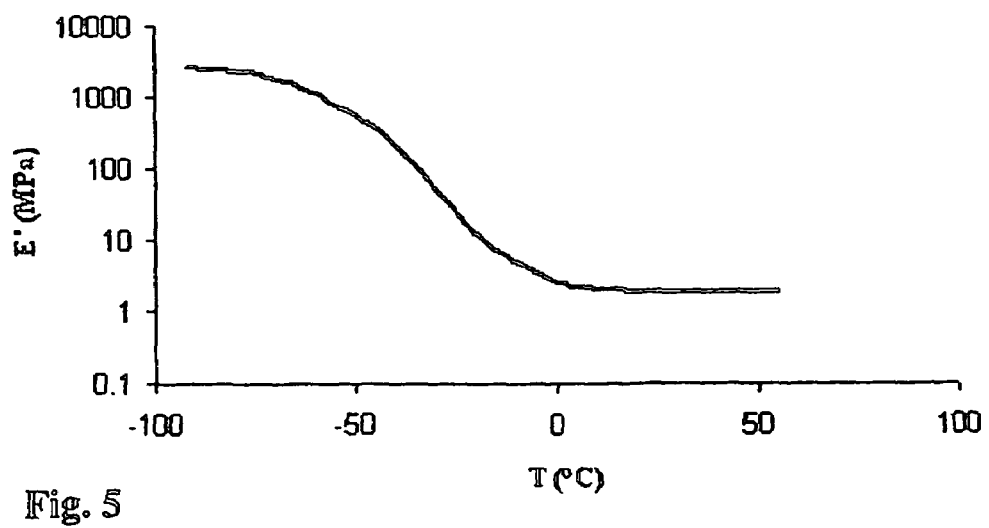
FIG. 5 shows the experimental DMA plot of a prior art primary coating material.

The corresponding DMA curves are reported in FIGS. 4*a* to 4*c* (examples 1-3 respectively) and FIG. 5 (comp. Exp. A).

Determination of Glass Transition Temperature (Tg) and Hardening Temperature (Th)

Based on the respective DMA plot of each cured primary coating material, the Tg, Th and modulus at Th of the material have been determined as mentioned in the descriptive part.

Thus, with ref. to FIG. 2, the Tg is determined by the intersection point of line A with line D. Line A is determined by interpolating the points of the DMA curve in the plateau region of the glassy state in the following manner. First of all, the median value of logE' in the region from −60° C. to −80° C. is calculated. Line A is then determined as the horizontal line (parallel to the x axis) passing through said value of LogE'. Line D is determined as the tangent to the inflection point of the DMA curve in the oblique portion "d" of said curve. The inflection point and the inclination of the tangent in that point are determined by means of the first derivative of the DMA curve; the abscissa of the minimum point of the derivative curve gives the respective abscissa of the inflection point on the DMA curve, while the ordinate gives the inclination (angular coefficient) of the tangent line in said inflection point. The derivative curve has been determined by calculating the derivative of each experimental point of the DMA curve and then fitting these points by means of a $6^{th}$ degree polynomial curve in the range +20/−40° C. around the minimum calculated derivative points.

Similarly, also the Th has been determined as the intersection point of line B with line D (see FIG. 2). Line D is as above determined, while line B is determined by interpolating the points of the DMA curve in the plateau region of the rubbery state in the following manner. First of all, the median value of logE' in the region from 20° C. to 40° C. is calculated. Line B is then determined as the horizontal line (parallel to the x axis) passing through said median value of LogE'.

Manufacturing of Optical Fibers

All the optical fibers used in the present experimental section has been manufactured according to standard drawing techniques, by applying a first (primary) coating composition on the drawn optical fiber, curing said coating composition and subsequently applying the secondary coating layer and curing it. The fiber is drawn at a speed of about 20 m/s and the cure degree of the coating layers is of at least 90%. The cure degree is determined by means of MICRO-FTIR technique, by determining the percentage of the reacted acrylate instaurations in the final cross-linked resin with respect to the initial photo-curable composition (e.g. as described in WO 98/50317).

Microbending Tests

Microbending effects on optical fibers were determined by the "expandable drum method" as described, for example, in G. Grasso and F. Meli "Microbending losses of cabled single-mode fibers", ECOC '88, pp. 526-ff, or as defined by IEC standard 62221 (Optical fibers—Measurement methods—Microbending sensitivity—Method A, Expandable drum; October 2001). The test is performed by winding a 100 m length fiber with a tension of 55 g on a 300 mm diameter expandable metallic bobbin, coated with rough material (3M Imperial® PSA-grade 40 µm).

The bobbin is connected with a personal computer which controls:
the expansion of the bobbin (in terms of variation of fiber length); and
the fiber transmission loss.

The bobbin is then gradually expanded while monitoring fiber transmission loss versus fiber strain.

The pressure exerted onto the fiber is calculated from the fiber elongation by the following formula:

$$p = \frac{EA\varepsilon}{R}$$

where E is the elastic modulus of glass, A the area of the coated fiber and R the bobbin radius.

For each optical fiber, the MAC has been determined as follows:

$$MAC = \frac{MFD}{\lambda_{co}}$$

where MFD (mode field diameter according Petermann definition) at 1550 nm and $\lambda_{CO}$ (lambda fiber cutoff −2 m length) are determined according to standard ITUT G650. Lambda cable cutoff (for NZD fibers) has been determined according to ITUT G650.

What is claimed is:

1. An optical fiber comprising: a) an internal glass portion; b) a first coating layer of a first polymeric material surrounding said glass portion; and c) a second coating layer of a second polymeric material surrounding said first coating layer, wherein said first polymeric material has a hardening temperature lower than −10° C., an equilibrium tensile modulus lower than 1.3 MPa wherein said first coating layer has a thickness of from 18 μm to 28 μm and wherein said second coating layer has a thickness of from 10 μm to 20 μm.

2. An optical fiber according to claim 1 wherein the thickness of the first coating layer is 22–23 μm.

3. An optical fiber according to claim 1 or 2 wherein the thickness of the second coating layer is 15 μm.

4. An optical fiber according to claim 1 wherein the first polymeric material has an equilibrium tensile modulus not lower than about 0.5 MPa.

5. An optical fiber according to claim 1 wherein the first polymeric material has an hardening temperature lower than −12° C.

6. An optical fiber according to claim 1 wherein the first polymeric material has a glass transition temperature not higher than about −30° C.

7. An optical fiber according to claim 6 wherein the glass transition temperature is not higher than about −40° C.

8. An optical fiber according to claim 6 wherein the glass transition temperature is not higher than about −50° C.

9. An optical fiber according to claim 1 wherein the first polymeric material has:
- a hardening temperature (Th) of from −10° C. to about −20° C. and a modulus measured at said Th lower than 5.0 MPa; or
- a hardening temperature (Th) of from −20° C. to about −30° C. and a modulus measured at said Th lower than 20.0 MPa; or
- a hardening temperature (Th) lower than about −30° C. and a modulus measured at said Th lower than 70.0 MPa.

10. An optical fiber according to claim 1 wherein the first polymeric material has:
- a hardening temperature (Th) of from −10° C. to about −20° C. and a modulus measured at said Th lower than 4.0 MPa; or
- a hardening temperature (Th) of from −20° C. to about −30° C. and a modulus measured at said Th lower than 15.0 MPa; or
- a hardening temperature (Th) lower than about −30° C. and a modulus measured at said Th lower than 50.0 MPa.

11. An optical fiber according to claim 1 wherein said second polymeric material has a modulus E' at 25° C. of from about 1000 MPa to about 2000 MPa.

12. An optical fiber according to claim 1 wherein said second polymeric material has a glass transition temperature higher than about 30° C.

13. An optical fiber according to claim 12 wherein said glass transition temperature is higher than 40° C.

14. An optical fiber according to claim 12 wherein said glass transition temperature is higher than about 50° C.

15. An optical fiber according to claim 1 wherein said first polymeric material is obtained by curing a radiation curable composition comprising a radiation curable oligomer comprising a backbone derived from polypropylene glycol and a dimer acid based polyester polyol.

* * * * *

UNITED STATES PATENT AND TRADEMARK OFFICE
CERTIFICATE OF CORRECTION

PATENT NO. : 7,200,310 B2 Page 1 of 1
APPLICATION NO. : 11/442279
DATED : April 3, 2007
INVENTOR(S) : Roba et al.

It is certified that error appears in the above-identified patent and that said Letters Patent is hereby corrected as shown below:

Title page, item (75), lines 10-11 (under "Inventors"), "Duurt Pleter Willem Alklma" should read --Duurt Pieter Willem Alkema--.

Signed and Sealed this

Seventeenth Day of June, 2008

JON W. DUDAS
*Director of the United States Patent and Trademark Office*